United States Patent
Xu et al.

(10) Patent No.: US 10,524,116 B2
(45) Date of Patent: Dec. 31, 2019

(54) INTERNET OF THINGS SERVICES ARCHITECTURE

(71) Applicant: iBasis, Inc., Lexington, MA (US)

(72) Inventors: Richard H. Xu, Wakefield, MA (US); Vitaliy G. Yurchenko, Framingham, MA (US); Ajay Joseph, Lexington, MA (US); Richard M. Pellegrini, Pembroke, MA (US)

(73) Assignee: iBasis, Inc., Lexington, MA (US)

( * ) Notice: Subject to any disclaimer, the term of this patent is extended or adjusted under 35 U.S.C. 154(b) by 0 days.

(21) Appl. No.: 15/634,692

(22) Filed: Jun. 27, 2017

(65) Prior Publication Data

US 2018/0376325 A1 Dec. 27, 2018

(51) Int. Cl.
*H04W 8/24* (2009.01)
*H04M 15/00* (2006.01)
(Continued)

(52) U.S. Cl.
CPC ........... *H04W 8/245* (2013.01); *H04L 43/028* (2013.01); *H04L 61/2061* (2013.01);
(Continued)

(58) Field of Classification Search
CPC ....... H04W 8/245; H04W 24/06; H04W 8/18; H04W 8/00; H04L 43/028; H04L 61/2061; H04L 61/6054; H04M 15/58
USPC ...................................................... 455/419
See application file for complete search history.

(56) References Cited

U.S. PATENT DOCUMENTS

| 5,940,512 A | 8/1999 | Tomoike |
| 6,085,084 A | 7/2000 | Christmas |

(Continued)

FOREIGN PATENT DOCUMENTS

| EP | 2 530 884 A1 | 12/2012 |
| EP | 2 675 111 A1 | 12/2013 |

(Continued)

OTHER PUBLICATIONS

Barriga et al., "M2M Remote—Subscription Management," Ericsson Review, 6 pages (2011).

(Continued)

*Primary Examiner* — Mong-Thuy T Tran
(74) *Attorney, Agent, or Firm* — Hamilton, Brook, Smith & Reynolds, P.C.

(57) ABSTRACT

According to at least one example embodiment, the present disclosure may be implemented in the form of a method or system for performing data traffic inspections and selecting an IMSI according to a switching logic. The example embodiment may include a data inspection module configured to inspect data requests from a mobile device assigned a first IMSI. The data inspection module may be further configured to determine data usage information of the mobile device from the inspected data requests. The example embodiment further includes a switching logic module communicatively coupled to the data inspection module. The switching logic module is configure to select a second IMSI associated with a second mobile network to assign to the mobile device, the selection of the second IMSI being at least partially based on the data service being requested by the mobile device.

24 Claims, 8 Drawing Sheets

(51) Int. Cl.
*H04L 12/26* (2006.01)
*H04L 29/12* (2006.01)
*H04W 24/08* (2009.01)
*H04W 8/18* (2009.01)
*H04W 8/00* (2009.01)

(52) U.S. Cl.
CPC .............. *H04M 15/58* (2013.01); *H04W 8/18* (2013.01); *H04W 24/08* (2013.01); *H04L 61/6054* (2013.01); *H04W 8/00* (2013.01)

(56) References Cited

U.S. PATENT DOCUMENTS

| | | | |
|---|---|---|---|
| 6,157,636 A | 12/2000 | Voit et al. | |
| 6,658,458 B1 | 12/2003 | Gai | |
| 6,735,190 B1 | 5/2004 | Chuah | |
| 6,788,647 B1 | 9/2004 | Mohaban et al. | |
| 6,810,250 B2 | 10/2004 | Jo et al. | |
| 6,839,340 B1 | 1/2005 | Voit | |
| 7,184,764 B2 | 2/2007 | Raviv et al. | |
| 7,738,465 B2 | 6/2010 | Akahane et al. | |
| 8,095,124 B2 | 1/2012 | Balia | |
| 8,478,238 B2 | 7/2013 | Mohammed et al. | |
| 8,537,695 B2 | 9/2013 | Wiley et al. | |
| 8,593,958 B2 | 11/2013 | Zhang | |
| 8,671,204 B2 | 3/2014 | Srinivasan | |
| 8,751,647 B1 | 6/2014 | Yip et al. | |
| 8,811,969 B2 | 8/2014 | Shi et al. | |
| 9,060,263 B1 | 6/2015 | Carames et al. | |
| 9,104,643 B2 | 8/2015 | DeCusatis | |
| 9,137,140 B2 | 9/2015 | Tao | |
| 9,179,316 B2 | 11/2015 | Raleigh | |
| 9,198,022 B1 | 11/2015 | Draznin et al. | |
| 9,198,074 B2 | 11/2015 | Raleigh et al. | |
| 9,247,424 B2 | 1/2016 | Haggerty et al. | |
| 9,288,750 B2 | 3/2016 | Tuli et al. | |
| 9,319,223 B2 | 4/2016 | Nix | |
| 9,374,700 B2 | 6/2016 | Trapp | |
| 9,451,098 B2 | 9/2016 | Zhu et al. | |
| 9,629,018 B2 | 4/2017 | Xu | |
| 9,781,229 B2 | 10/2017 | Srinivas et al. | |
| 9,955,332 B2* | 4/2018 | Raleigh | H04W 4/50 |
| 10,263,903 B2 | 4/2019 | Xu | |
| 2002/0068578 A1 | 6/2002 | Agarwal et al. | |
| 2002/0080819 A1 | 6/2002 | Tsao | |
| 2004/0162058 A1 | 8/2004 | Mottes | |
| 2005/0152275 A1 | 7/2005 | Laurila et al. | |
| 2006/0187942 A1 | 8/2006 | Mizutani | |
| 2008/0049621 A1 | 2/2008 | McGuire | |
| 2008/0125114 A1 | 5/2008 | Dorenbosch | |
| 2009/0116398 A1 | 5/2009 | Shi et al. | |
| 2010/0158009 A1 | 6/2010 | Lee | |
| 2010/0191846 A1 | 7/2010 | Raleigh | |
| 2010/0311402 A1 | 12/2010 | Srinivasan et al. | |
| 2011/0235595 A1* | 9/2011 | Mehta | H04W 8/082 370/329 |
| 2011/0275344 A1 | 11/2011 | Momtahan et al. | |
| 2011/0310734 A1 | 12/2011 | Mizukoshi | |
| 2012/0034916 A1 | 2/2012 | Hu et al. | |
| 2012/0041965 A1 | 2/2012 | Vasquez et al. | |
| 2012/0108205 A1 | 5/2012 | Schell et al. | |
| 2012/0108206 A1 | 5/2012 | Haggerty | |
| 2012/0108295 A1 | 5/2012 | Schell et al. | |
| 2012/0198061 A1* | 8/2012 | Stenfelt | G06Q 30/02 709/224 |
| 2012/0275442 A1* | 11/2012 | Malets | H04W 4/16 370/338 |
| 2012/0282924 A1* | 11/2012 | Tagg | H04W 60/06 455/432.1 |
| 2013/0029637 A1* | 1/2013 | Hillier | H04W 8/26 455/411 |
| 2013/0031191 A1 | 1/2013 | Bott | |
| 2013/0054761 A1 | 2/2013 | Kempf et al. | |
| 2013/0064079 A1 | 3/2013 | Zhang | |
| 2013/0100819 A1 | 4/2013 | Anchan et al. | |
| 2013/0114615 A1 | 5/2013 | Suemitsu et al. | |
| 2013/0132854 A1* | 5/2013 | Raleigh | G06F 3/0482 715/738 |
| 2013/0142073 A1 | 6/2013 | Shikitani | |
| 2013/0157673 A1 | 6/2013 | Brusilovsky | |
| 2013/0195457 A1 | 8/2013 | Levy et al. | |
| 2013/0227646 A1 | 8/2013 | Haggerty et al. | |
| 2013/0230047 A1 | 9/2013 | Subrahmaniam et al. | |
| 2014/0004827 A1 | 1/2014 | O'Leary | |
| 2014/0024361 A1* | 1/2014 | Poon | H04W 12/06 455/419 |
| 2014/0105119 A1* | 4/2014 | Gupta | H04L 61/1588 370/329 |
| 2014/0140507 A1 | 5/2014 | Park et al. | |
| 2014/0169286 A1 | 6/2014 | Ku | |
| 2014/0199961 A1* | 7/2014 | Mohammed | H04L 63/0428 455/406 |
| 2014/0199962 A1* | 7/2014 | Mohammed | H04M 15/70 455/406 |
| 2014/0233399 A1 | 8/2014 | Mann et al. | |
| 2014/0235210 A1 | 8/2014 | Park et al. | |
| 2014/0270764 A1 | 9/2014 | DeCusatis et al. | |
| 2014/0301203 A1 | 10/2014 | Kampmann | |
| 2014/0301397 A1 | 10/2014 | Zhou | |
| 2014/0329502 A1 | 11/2014 | Lee et al. | |
| 2014/0380470 A1 | 12/2014 | Taniuchi et al. | |
| 2015/0032890 A1 | 1/2015 | Bott | |
| 2015/0065125 A1 | 3/2015 | Patel et al. | |
| 2015/0081421 A1* | 3/2015 | Moseman | G06Q 30/0246 705/14.45 |
| 2015/0222554 A1 | 8/2015 | Xu | |
| 2015/0223104 A1 | 8/2015 | Xu | |
| 2015/0163731 A1 | 11/2015 | Kotecha | |
| 2015/0341791 A1 | 11/2015 | Yang et al. | |
| 2015/0349615 A1 | 12/2015 | Lee et al. | |
| 2015/0358757 A1* | 12/2015 | Ford | H04W 4/001 455/418 |
| 2015/0373530 A1 | 12/2015 | Stein | |
| 2016/0020802 A1 | 1/2016 | Lee et al. | |
| 2016/0050557 A1 | 2/2016 | Park et al. | |
| 2016/0088456 A1 | 3/2016 | Ramprasad et al. | |
| 2016/0183095 A1 | 6/2016 | Huber et al. | |
| 2016/0242033 A1 | 8/2016 | Jung et al. | |
| 2016/0286377 A1 | 9/2016 | Stein et al. | |
| 2016/0381699 A1* | 12/2016 | Rubin | H04L 67/2809 370/329 |
| 2017/0070424 A1 | 3/2017 | Xiao | |
| 2017/0230820 A1* | 8/2017 | Ho | H04B 1/3816 |
| 2017/0289283 A1* | 10/2017 | Ungerer | H04L 67/22 |
| 2017/0332421 A1* | 11/2017 | Sternberg | H04W 76/021 |
| 2018/0077564 A1 | 3/2018 | Xu et al. | |
| 2018/0160385 A1* | 6/2018 | Chastain | H04W 8/04 |

FOREIGN PATENT DOCUMENTS

| | | |
|---|---|---|
| WO | 2007047479 | 4/2007 |
| WO | 2007/092573 A2 | 8/2007 |
| WO | 2010023645 | 3/2010 |
| WO | 2013112642 A2 | 8/2013 |
| WO | 2015/119967 | 8/2015 |
| WO | 2015119965 | 8/2015 |
| WO | WO 2016/010387 A1 | 1/2016 |
| WO | 2016145121 A2 | 9/2016 |

OTHER PUBLICATIONS

Deutshe Telekom, "Global M2M Association eliminates borders," [Online], [Retrieved on Aug. 12, 2016], Retrieved from the Internet URL: https://www.telekom.com/media/enterprise-solutions/ 267180, 3 pages (Feb. 18, 2015).

MVNO Dynamics, "Globetouch and UROS Launch Global eSIM Ecosystem to Deliver Secure, Cost-Efficient Roaming," Press Release, [Online], [Retrieved on Sep. 16, 2016], Retrieved from the Internet URL: https://www.mvnodynamics.com/2106/03/04/globeltouch-and-uros-launch . . . , 4 pages (Mar. 4, 2016).

(56) References Cited

OTHER PUBLICATIONS

GSM Association, "Remote Provisioning Architecture for Embedded UICC Test Specification," Version 3.1, 524 pages (May 31, 2016).
GSM Association, "SGP.22 CR1003 RSP Technical Specification," Change Request Form, 221 pages (Jul. 8, 2016).
GSM Association, "RSP Technical Specification," Version 2.1, 247 pages (Feb. 27, 2017).
GSM Association, "RSP Architecture," Version 2.1, 94 pages (Feb. 27, 2017).
GSM Association, "RSP Architecture," Version 2.0, 52 pages (Aug. 23, 2016).
Hong Kong Mobility Partner Program, "Simgo Launches eSIM 4G Hotspot," [Online] [Retrieved on Sep. 16, 2016], Retrieved from the Internet URL: https://www.applemobility.hk/2016/02/25/simgo-launches-esim-4h-hotspot/, 3 pages (2016).
MacKee et al., "Navigating the eSIM revolution as an MNO, Embedded SIM—a game changer in mobile telcom," Oslo, 19 pages (Feb. 4, 2016).
Meukel et al., "E-SIM for consumers—a game changer for mobile telecommunications?," McKinsey & Company, [Online], [Retrieved on Aug. 12, 2016], Retrieved from the Internet URL: https://www.mckinsey.com/industries/telecommunications/our-insights/ . . . , 12 pages (Jan. 2016).
Numerex, "5 Key Ingredients for a Robust, End-to-End IoT Platform," 8 pages [Online] [Retrieved on Jan. 20, 2017].
Numerex Network Solutions, "Simplifying M2M Connectivity," 2 pages [Online] [Retrieved on Jan. 20, 2017].
Vahidian, "Evolution of the SIM to eSIM," NTNU-Trondheim, Norwegian University of Science and Technology, Department of Telematics, 110 pages (Jan. 21, 2013).
McKeown, N., et al., "OpenFlow: Enabling Innovation in Campus Networks," retrieved from archive.openflow.org/documents/openflow-wp-latest.pdf (2008).
"OpenFlow Switch Specification, Version 1.3.0 (Wire Protocol 0x04)," The Open Networking Foundation, pp. 1-105 (2012).
"Inter-Service Provider IP Backbone Guidelines, PRD IR.34, Version 4.9," GSM Association, Official Document IR.34, pp. 1-48 (2010).
"Applying Network Policy Control to Asymmetric Traffic: Considerations and Solutions," Sandvine Intelligent Broadband Networks, An Industry Whitepaper, Version 2.0, pp. 1-14, retrieved on Apr. 22, 2016, copyright 2015.
"Online Charging with Diameter Gy: Considerations for Accuracy and Reliability," Sandvine Intelligent Broadband Networks, An Industry Whitepaper, Version 2.0, pp. 1-10, retrieved on Apr. 22, 2016, copyright 2015.
"Syniverse Hosted Roaming Policy Management, "Syniverse Technologies, LLC., pp. 1-3 (2015).
"Syniverse Roaming Control Center," Syniverse Technologies, LLC., pp. 1-3 (2014).
"Syniverse Roaming Intelligence Suite," Syniverse Technologies, LLC., pp. 1-3 (2014).
"Syniverse User Experience Management," Syniverse Technologies, LLC., pp. 1-5 (2016).
LTE International Roaming Whitepaper, http://carrier.huawei.com/en/technical-topics/core-network/LTE-roaming-whitepaper, pp. 1-16 [retrieved on Apr. 22, 2016].
Manulis, M., et al, "Authenticated Wireless Roaming via Tunnels: Making Mobile Guests Feel at Home," Proceedings of the ACM Symposium on Information, Computer and Communications Security (ASIACCS'09), pp. 1-22 (2009).
Non-Final Office Action for U.S. Appl. No. 15/260,897, entitled "Policy Control Framework," dated Aug. 31, 2018.
International Search Report and Written Opinion for Int'l Application No. PCT/US2018/039759, titled: Internet of Things Services Architecture, dated Sep. 26, 2018.
Non-Final Office Action for U.S. Appl. No. 15/260,897, entitled "Policy Control Framework," dated Mar. 14, 2019.
Rogers, Wireless: "Embedded UICC Remote Provisioning Discussion", Retrieved from the Internet: URL:http://www.3gpp.org/ftp/tsg_sa?WG3_Security/TSGS3_LI/2012_46_Quebec/ [retrieved on Mar. 22, 2013], vol. SA WG3, no. Quebec City, Canada (2013).
Final Office Action for U.S. Appl. No. 15/260,897, titled: "Policy Control Framework," dated Sep. 11, 2019.

* cited by examiner

INTERNET OF THINGS SERVICES ARCHITECTURE

BACKGROUND

Wireless communications systems such as the Long Term Evolution (LTE) mobile communications system, also referred to as Evolved Packet System (EPS) or 4th Generation (4G) system, the Global System for Mobile (GSM) communications, or the Wideband Code Division Multiple Access (W-CDMA) mobile communications system, typically utilize a subscriber identification module (SIM) card to identify and authenticate subscribers on mobile network devices (e.g. mobile phones, computers, Internet of Things (IoT) devices and any device capable of a mobile network data connection). A SIM card is an integrated circuit that stores an international mobile subscriber identity (IMSI) number and its related keys.

Mobile network operators of such wireless communications systems identify and authenticate mobile devices connected to their network using the information provided by the mobile device's SIM card (e.g., the mobile device's IMSI). Mobile network operators also typically implement different functionalities based on a subscriber's identity and profile stored by the network operator, e.g., billing functionalities, quality of service (QoS) functionalities, etcetera., to manage the offered services and the corresponding usage by subscribers.

In order to expand geographical coverage of offered services beyond the network coverage of each service provider, network operators typically engage in interworking and roaming arrangements. The interworking and roaming arrangements between different network operators are made possible through interconnection between the service providers. For example, when a mobile network subscriber connects to a visited mobile network, the visited mobile network identifies the home network of the mobile subscriber through the mobile's subscriber's IMSI. With the IMSI of the mobile subscriber, the visited mobile network is able to authenticate the mobile subscriber with their home network and provide service to the mobile subscriber based on roaming arrangements between the two networks.

SUMMARY

A recently developed type of SIM card is an embedded SIM (eSIM) or embedded universal integrated circuit card (eUICC). The eSIM can not only take the form of a traditional removable and swappable SIM card, but can also be embodied as a non-replaceable embedded chip. An eSIM has the ability to be provisioned, remotely or locally, with different subscriber profiles or identities. This allows a mobile device equipped with an eSIM to dynamically change its subscriber identification, which in turn allows the mobile device to change the mobile network or service provider that the mobile device is currently subscribed. For example, an embedded UICC (eUICC) can store one SIM profile for a local mobile network operator (MNO) and another SIM profile for an international MNO.

The GSM Association (GSMA) has developed the "Remote Provisioning Architecture for Embedded UICC Technical Specification," Version 3.1 (May 31, 2016) (referred to herein as "GSMA eSIM Specification" and incorporated by reference), "RSP Technical Specification," Version 2.1 (Feb. 21, 2017) (herein incorporated by reference) and "RSP Architecture," Version 2.1 (Feb. 21, 2017) (herein incorporated by reference) which describe an architecture for the remote provisioning and management of the eUICC in machine-to-machine (M2M) devices which are not easily reachable. The GSMA eSIM Specification resolves such limitation with remote SIM provisioning system to enable dynamically downloading a new SIM profile into an eSIM card, where it can switch to another MNO with the newly downloaded SIM profile, as if another new SIM card were plugged in.

Such downloading of a SIM profile and switching to another MNO with the newly downloaded profile normally relies on sending messages via the short message service (SMS) protocol from a remote SIM provisioning platform (RSP) to the targeted eSIM card via its current SIM profile and current attached cellular network (e.g., GSM, 3G, or LTE network). Once receiving a command via the SMS from the RSP, the eSIM card can do a few actions per the GSMA eSIM Specification, such as downloading a new SIM profile, switching to another SIM profile, disabling/deleting one of the downloaded profiles, etcetera. Once the action is executed, the eSIM card (through the device) sends a confirmation to the RSP via SMS regarding the action taken. For example, after switching to another profile, and the device is attached to a new cellular network with the new profile, the eSIM normally sends a confirmation message via the SMS from the new network to the RSP where the status of the previous action is updated.

Enabling mobile devices to be provisioned with different subscriber identities allows for numerous enhancements to how mobile services are provided. For example, instead of a mobile device roaming on a visited mobile network based on a roaming arrangement between the visited mobile network and the mobile device's home mobile network, the mobile device equipped with an eSIM could be provisioned with a subscriber identity belonging to the visited mobile network. In other words, the mobile device would no longer be roaming on the visited network, because the mobile device's new subscriber identity (profile) is a subscriber of the visited mobile network. The visited mobile network would then begin providing the mobile device service based on local mobile service agreement and not a roaming arrangement. In fact the visited mobile network would now be (at least operationally) the mobile device's home or local mobile network.

Another application of eSIM technology is the creation of a global mobile service provider network that maintains mobile service arrangements with many different mobile network operators around the globe. The global mobile service provider network may maintain subscriber profiles with numerous mobile network operators and provision a mobile device with a specific subscriber identity (profile) associated with a chosen mobile network operator depending on any number of factors (e.g., country/location, mobile network operator, cost, regulations, type of device, data usage, Quality of Service (QoS), real-time data requests, etcetera.). The global mobile service provider network may select the mobile network operator of a mobile device (or switch the mobile network operator of the mobile device) based on a set of switching logics. For example, if the mobile device changes locations, the global mobile service provider network may utilize a switching logic that causes the mobile device to be provisioned with (or assigned) a subscriber identity associated with a subscriber profile of a local mobile network operator at the mobile device's current location.

Embodiments of the present disclosure enhance a global mobile service provider network's ability to provide service to mobile devices around the globe based arrangements with many different mobile network operators. Embodiments of the present disclosure are particularly applicable Internet of Things (IoT) devices (also known as machine-to-machine (M2M) devices). IoT devices benefit from the global interoperability the global service provider network is able to provide. Embodiments of the present disclosure enable IoT devices to be carried anywhere around the global and receive mobile data service. Further, by routing data traffic through the global service provider network, the global service provider attains real-time visibility into the data traffic of each of its mobile subscribers regardless of the current mobile network, profile or IMSI the IoT device is using. The global service provider network may also exercise increased control over the data usage of each IoT device through the use of a policy control platform. For example, manufacturers IoT devices (whom may be the direct customers of the global service provider) may instruct the global service provider network to limit the IoT devices' data access to specific data services the IoT devices were designed to utilize. Further, the manufacturers of IoT devices may instruct the global service provider network to route the data traffic for the IoT devices to the manufacturer's private network regardless of the current mobile network, profile or IMSI the mobile device is using.

According to some embodiments, each of the mobile network operators working with the global mobile service provider network allocates a plurality of subscriber profiles to the global service provider network. The global service provider network maintains the subscriber profiles from each of the mobile network operators and may provision a mobile device with an IMSI associated with a subscriber profile from any of the mobile network operators. This effectively gives the global service provider network control of the mobile network the mobile device receives service from.

The systems and methods of the present disclosure provide powerful technological tools that leverage the global service provider network's ability to control and switch the assigned IMSI of a mobile device to enable a highly customizable global mobile service for mobile devices equipped with eSIM chips or removable eUICC cards. In some embodiments, the global service provider network may utilize real-time visibility of the mobile device's data traffic as it passes through the global service provider's network to determine which IMSI to assign the mobile device. Further, the global service provider network has the capability to monitor a plurality mobile devices' data traffic from a mobile network, and based on information determined from the data traffic, the global service provider network may measure or derive network performance metrics of the mobile network.

According to at least one example embodiment, the present disclosure may be implemented in the form of a method or corresponding apparatus for performing data traffic inspections and selecting an IMSI according to a switching logic. The at least one example embodiment may include a switching logic module configured to receive data usage information associated with a mobile device assigned a first IMSI associated with a first mobile network, the data usage information including an indication of a data service being requested by the mobile device, select a second IMSI associated with a second mobile network to assign to the mobile device, said selecting of the second IMSI at least partially based on the data service requested by the mobile device, and assign the second IMSI to the mobile device.

Some embodiments may include a data inspection module (and/or a policy control module) configured to inspect data requests from a mobile device assigned a first IMSI associated with a first mobile network. In some embodiments, the data inspection module utilizes deep packet inspection to inspect the data request from the mobile device. The data inspection module may be further configured to determine data usage information of the mobile device from the inspected data requests, the data usage information including a data service being requested by the mobile device. The at least one example embodiment further includes a switching logic module communicatively coupled to the data inspection module. According to another aspect of the example embodiment, the switching logic module is configured to select a second IMSI associated with a second mobile network to assign to the mobile device, the selection of the second IMSI at least partially based on the data service being requested by the mobile device. The switching logic module being further configured to assign the second IMSI to the mobile device.

According to some embodiments, the data inspection module is further configured to determine network performance metrics for a given mobile network based on inspecting data traffic from a plurality of mobile devices, each of the plurality of mobile devices assigned an IMSI associated with the given mobile network.

According to another aspect of the example embodiment, the data usage information may include any one of: condition of the mobile network, type of data the mobile device is requesting, and amount of data the mobile device has consumed.

According to some embodiments, the switching logic module is configured to select the second IMSI based on a rate the second mobile network charges for the data service requested by the mobile device.

According to some embodiments, the data inspection module is further configured to track an amount of data used by a plurality of mobile devices over a given period of time, each mobile device being assigned an IMSI associated with the first mobile network. The switching logic module being further configured to select different IMSIs to assign to at least some of the plurality mobile devices, each different IMSI being associated with a network other than the first mobile network, and the selection being at least partially based on the amount of data used by the plurality of mobile devices over the given period of time. After the selection, the switching logic module being further configured to assign the selected different IMSIs to the at least some of the plurality of mobile devices.

According to some embodiments, the data inspection module may include policy control functionality and be configured to deny, allow or modify an inspected data request based on a data policy associated with a currently assigned IMSI of the mobile device. In some embodiments, the data inspection module is configured to deny, allow or modify an inspected data request based on a type of the mobile device.

In some embodiments, the selection of the second IMSI is further based on any one or more of the following: country of the first mobile network or the second mobile network, location of the mobile device, operator of the first mobile network or the second mobile network, data rate cost of the first mobile network or the second mobile network, and quality of service of first mobile network or the second mobile network.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

The teachings of all patents, published applications and references cited herein are incorporated by reference in their entirety.

Figure 1A:
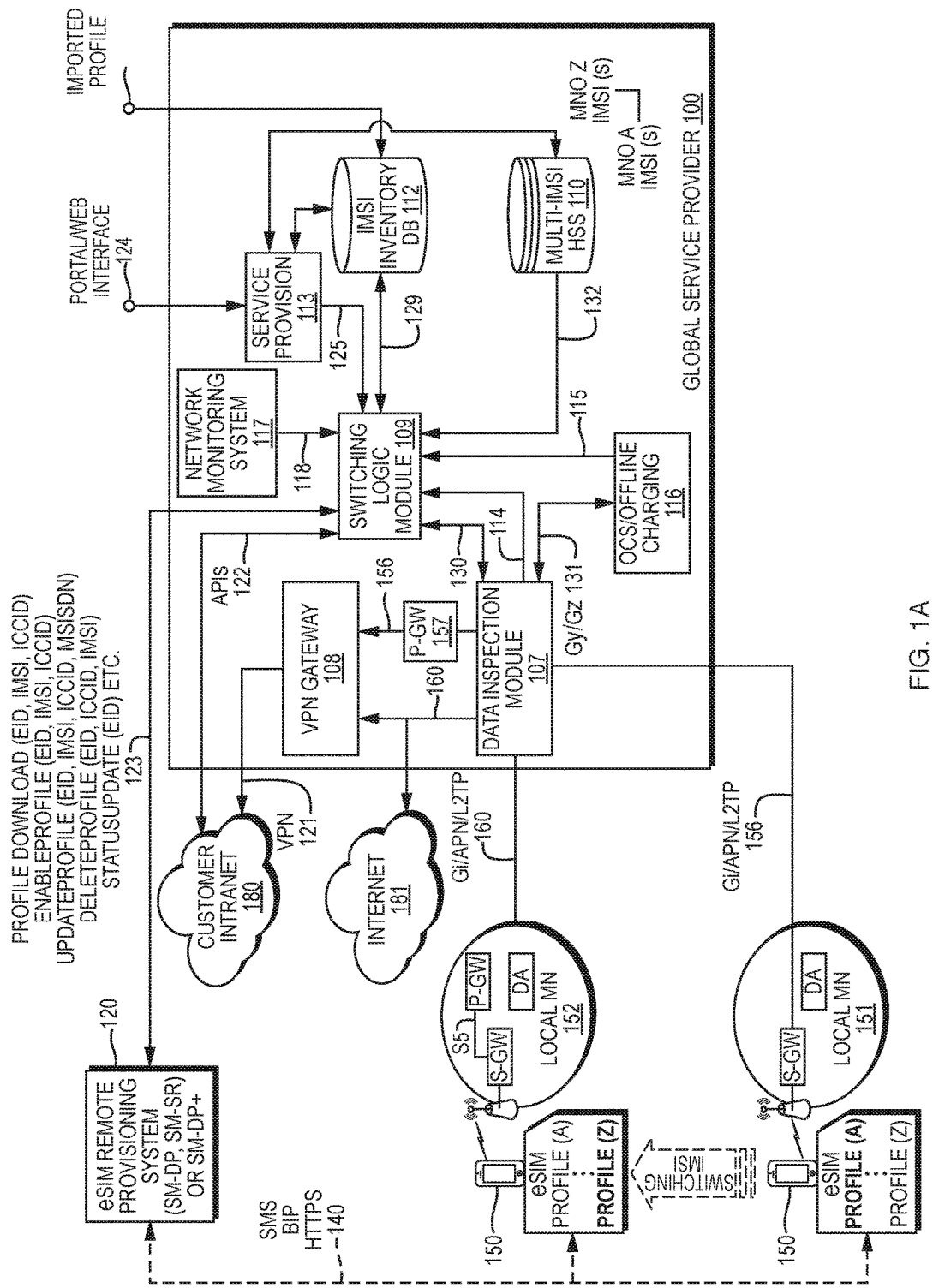
FIG. 1A is a diagram illustrating an example communications system architecture enabling a global service provider network to control the remote provisioning of a mobile device.

FIG. 1A illustrates an example communications system architecture enabling a global service provider network 100 to control the remote provisioning of a mobile device 150. According to the example embodiment illustrated in FIG. 1A, a mobile device 150 with an eSIM provisioned with an IMSI associated with Profile A, and attached to the local Mobile Network (MN) 151. The mobile device 150 can be any type of mobile device capable of a data connection and having an eSIM (e.g., smart phone, computer, an IoT device, machine to machine (M2M) device, etcetera.). While the mobile device 150 is attached to the local MN 151, the mobile device is provisioned with an IMSI that has a subscriber profile (i.e., Profile A) with the local MN 151. Thus, MN 151 provides the mobile device 150 with data service as MN 151 would any of its local mobile subscribers.

According to some embodiments, MN 151 recognizes that the subscriber Profile A associated with the IMSI currently provisioned to mobile device 150 has been previously allocated by MN 151 to the global service provider network 100. In some embodiments, mobile network operators (e.g., the mobile network operators of MN 151 and 152) have allocated a plurality of subscriber profiles to the global service provider network 100. The mobile network operators may associate all the allocated profiles with the global service provider network 100 such that all usage and billing information tracked by the mobile operators is attributed to the global service provider network, and not necessarily the owner/user of the mobile devices sporadically provisioned with any of the allocated profiles (or IMSIs associated with the profiles).

According to some embodiments, the global service provider network 100 may provision or cause mobile devices to be provisioned with any of the subscriber profiles. In some embodiments, the global service provider network 100 tracks the data usage associated with each mobile device and each subscriber profile. By tracking the data usage per mobile device, the global service provider network 100 is able to bill the owner/user of each mobile device or any other party associated with each mobile device.

Referring back to FIG. 1A, the MN 151 may route the data traffic from the mobile device 150 to the data inspection module 107 located at the global service provider network 100. In some embodiments, MNO 151 utilizes an access point name (APN) to establish a data connection 156 directly with the P-GW 157 at global service provider network 100, and the established data connection is used to direct all of mobile device's data traffic to the global service provider network 100. In some embodiments, the data connection 156 between MN 151 and global service provider network 100 may transmit, for example, data requests from mobile device 150, data packets both to and from mobile device 150, and any messaging or signaling protocol related to the mobile device's data traffic. In some embodiments the data connection 156 may be established using a virtual private network (VPN), a Gi interface, or Layer 2 Tunneling Protocol (L2TP).

According to some embodiments, the data traffic is routed to the data inspection control module 107 that monitors the data usage of mobile device 150. The data inspection module 107 could be standalone service element or be part of functions integrated in P-GW 157. Further, the data inspection module 107 may include policy control functionality to control the data usage of mobile device 150 based on data policies. The data policies may be pre-defined or dynamically created. In some embodiments, the data policy may be associated with the mobile device, the subscriber profile (or IMSI), or a combination of both. The policy control functionality of the data inspection module 107 is defined in more detail below, and in co-pending U.S. patent application Ser. No. 15/260,897 herein incorporated by reference.

In some embodiments, the data inspection module 107 inspects data requests from the mobile device 150 using deep packet inspection. The data inspection module 107 may then determine data usage information of the mobile device 150 from the inspected data requests. According to some embodiments, the data usage information may include information regarding the data service (e.g., application, web browsing, etcetera) being requested by mobile device 150. The data inspection module 107 communicates the data usage information to the switching logic module 109.

According to some embodiments, the switching logic module 109 receives control instructions and rules from a service provisioning element 113 for the mobile devices associated with the global service provider network 100. The switching logic module 109, based on pre-defined rules, decides which subscriber profile and IMSI is assigned to mobile device 150. The switching logic module 109 bases its decision on a plurality of inputs and a switching logic. The plurality of inputs may include the data usage information determined by the data inspection module 107 (shown as input 114).

In addition to input from the data inspection module 107, the switching logic module 109 may receive input from one or more additional elements on the global service provider network 100 including multi-IMSI home subscriber server (HSS) 110 (shown as input 132), IMSI inventory database 112 (shown as input 129), service provision module 113 (shown as input 125), OCS/Offline charging 116 (shown as input 115), network monitoring system 117 (shown as input 118), and one or more customer service networks 180 (shown as input 122).

According to the example embodiment illustrated in FIG. 1A, the switching logic module 109 selects a different IMSI associated with Profile Z of the local MN 152 to assign mobile device 150 based on an internal switching logic and one or more of the plurality of inputs (114, 115, 118, 122 132, 125 and/or 129) received by the switching logic module 109. In some embodiments, the selection of a different IMSI (i.e., the decision to change the IMSI of a mobile device) is at least partially based on the data service being requested by the mobile device.

According to this example embodiment, the switching logic module 109 causes the eSIM remote provisioning system (SM-DP, SM-SR or SM-DP+) 120 to remotely provision mobile device 150 with the IMSI associated with Profile Z on MN 152. The eSIM remote provisioning system 120 may remotely provision the mobile device through Short Message Service (SMS), Bearer Independent Protocol (BIP), or Hypertext Transfer Protocol Secure (HTTPS) 140. This causes the mobile device 150 to detach from MN 151 and then attach to MN 152. MN 152 now provides service to mobile device 150. The eSIM remote provisioning system 120 may operate as described in the Remote Provisioning Architecture for Embedded UICC Technical Specification," Version 2.1 (Nov. 1, 2015) herein incorporated by reference. Additionally, the eSIM remote provisioning system 120 may operate as described in co-pending U.S. Application No. 62/479,093 herein incorporated by reference.

In some embodiments, MN 152 establishes a data connection 160 with global service provider network 100. The global service provider network 100 routes the data traffic from mobile device 150 through data inspection module 107. As stated above, data inspection module 107 may provide real-time visibility and control of mobile device 150's data traffic as it passes through the data inspection module 107. In some embodiments, the data traffic may then be passed to an external public IP network (e.g., the Internet) 181 or the data traffic may be routed to a virtual private network (VPN) gateway 108. The VPN gateway 108 may assign a designated IP address for a customer associated with the mobile device 150, thus enabling the mobile device 150 to access a private customer network/intranet 180. The VPN connection 121 forms a secure IP connection from the global service provider network 100 to the customer's private network 180 to carry the data traffic between the customer's private network 100 and mobile device 150. In some embodiments, the VPN gateway 108 may aggregate data traffic from a plurality of mobile devices associated with a customer and establish secured connection for the aggregated data traffic. In some embodiments, the mobile device 150 is able to access and utilize a data service on the customer's private network because the mobile device's data traffic is routed by the local mobile network to the global service provider 100 to the customer's private network 180.

Figure 1B:
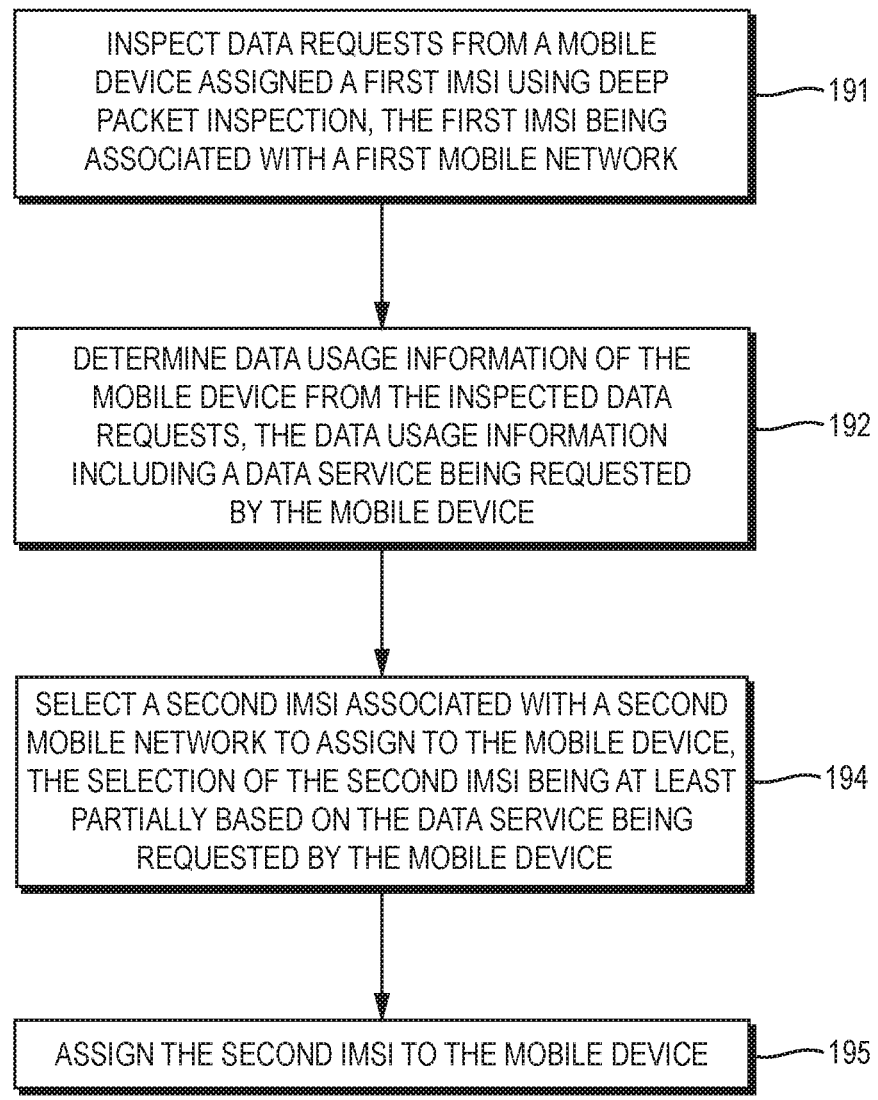
FIG. 1B is a flow chart illustrating an example method for selecting and switching a mobile device's profile/IMSI.

FIG. 1B is a flow chart illustrating an example method for selecting and switching a mobile device's profile/IMSI. According to the example method, the data inspection module 107 may inspect 191 data requests from a mobile device assigned a first IMSI using deep packet inspection, the first IMSI being associated with a first mobile network, and determine 192 data usage information of the mobile device from the inspected data requests, the data usage information including a data service being requested by the mobile device. According to the example method, the switching logic module 109 may be coupled to the data inspection module 107 and configured to select 194 a second IMSI associated with a second mobile network to assign to the mobile device, the selection of the second IMSI being at least partially based on the data service being requested by the mobile device, and assign 195 the second IMSI to the mobile device.

Figure 2A:
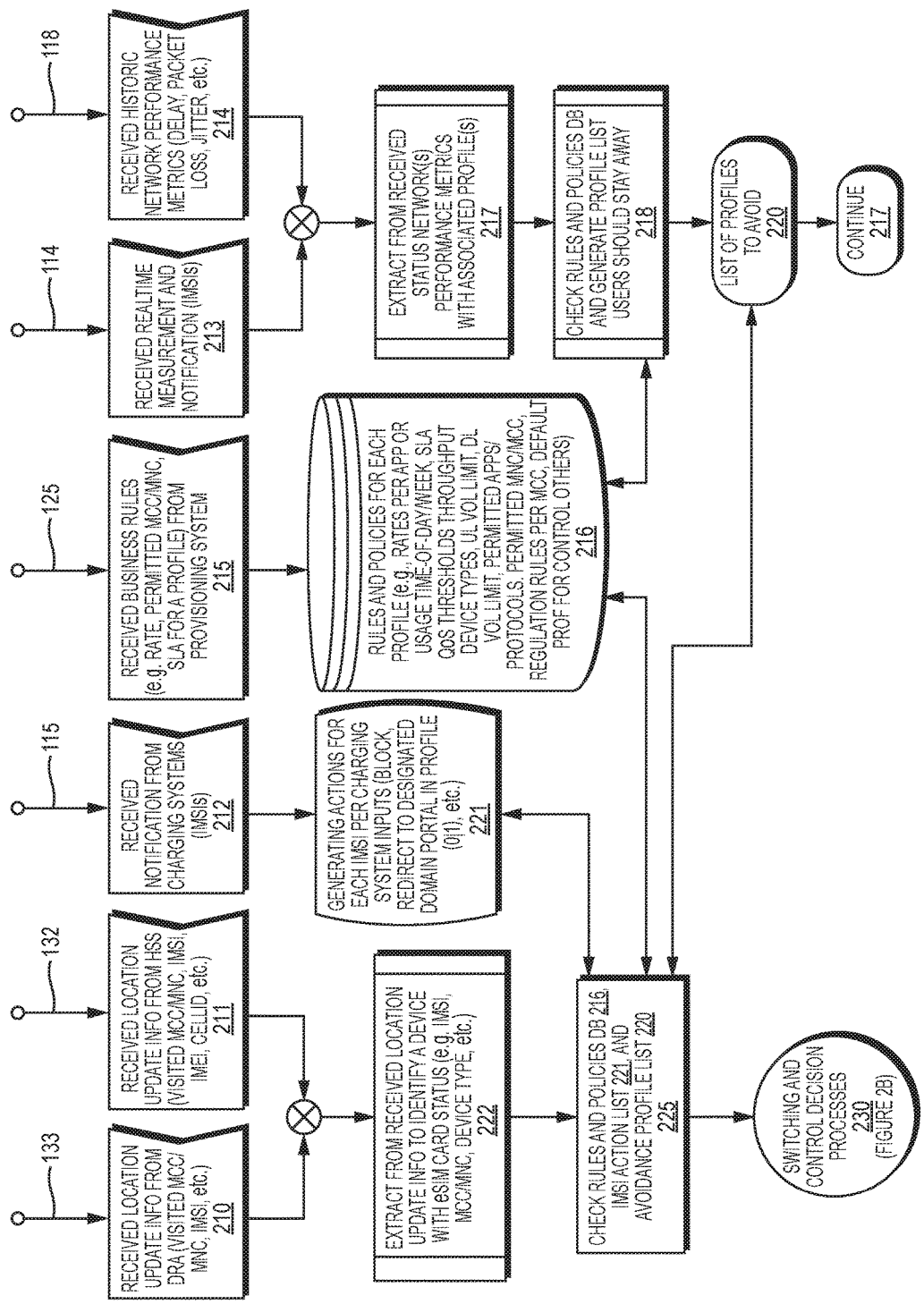
FIG. 2A-2C illustrate an example switching logic of the switching logic module according to some embodiments.
Figure 2B:
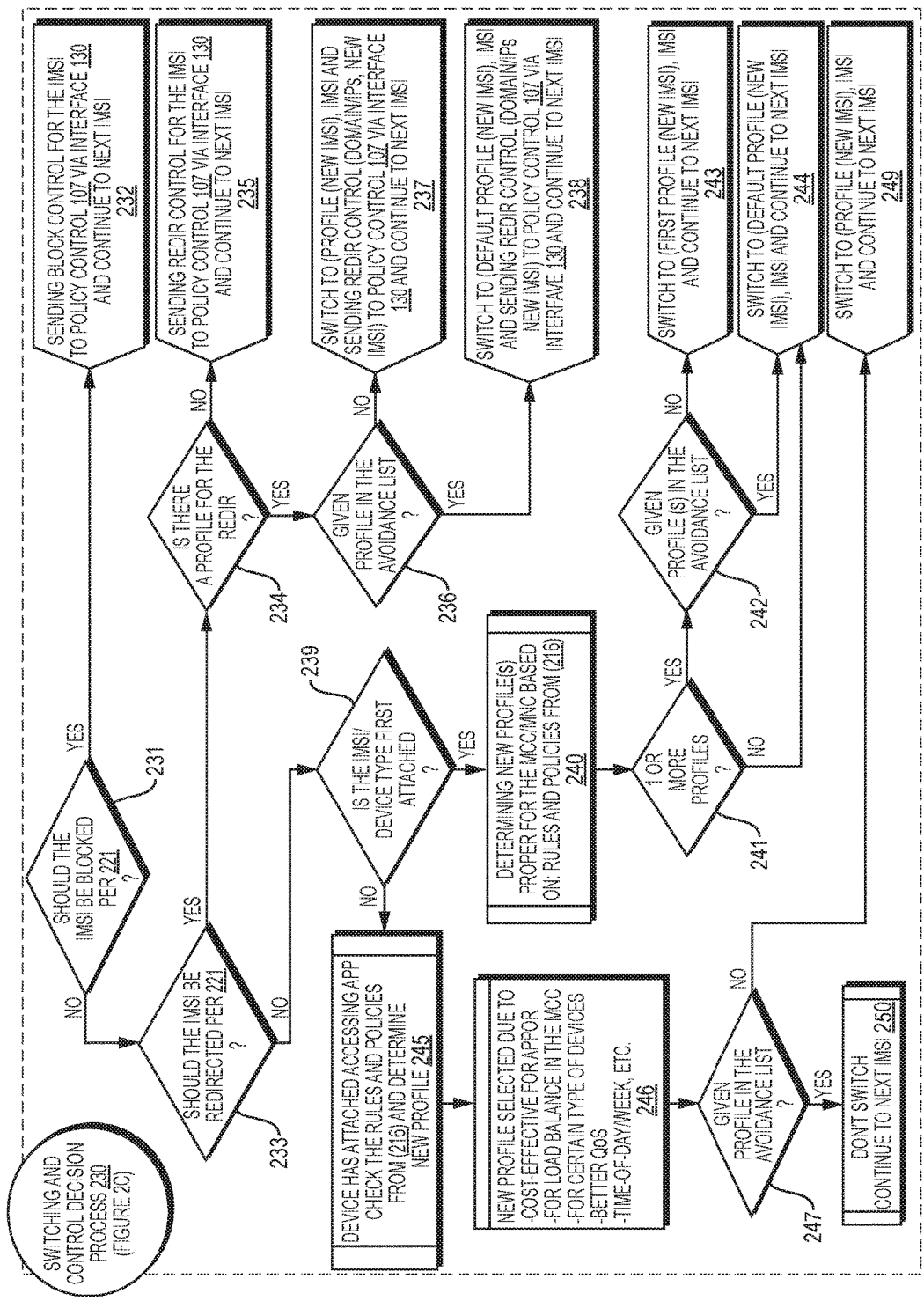
Figure 2C:
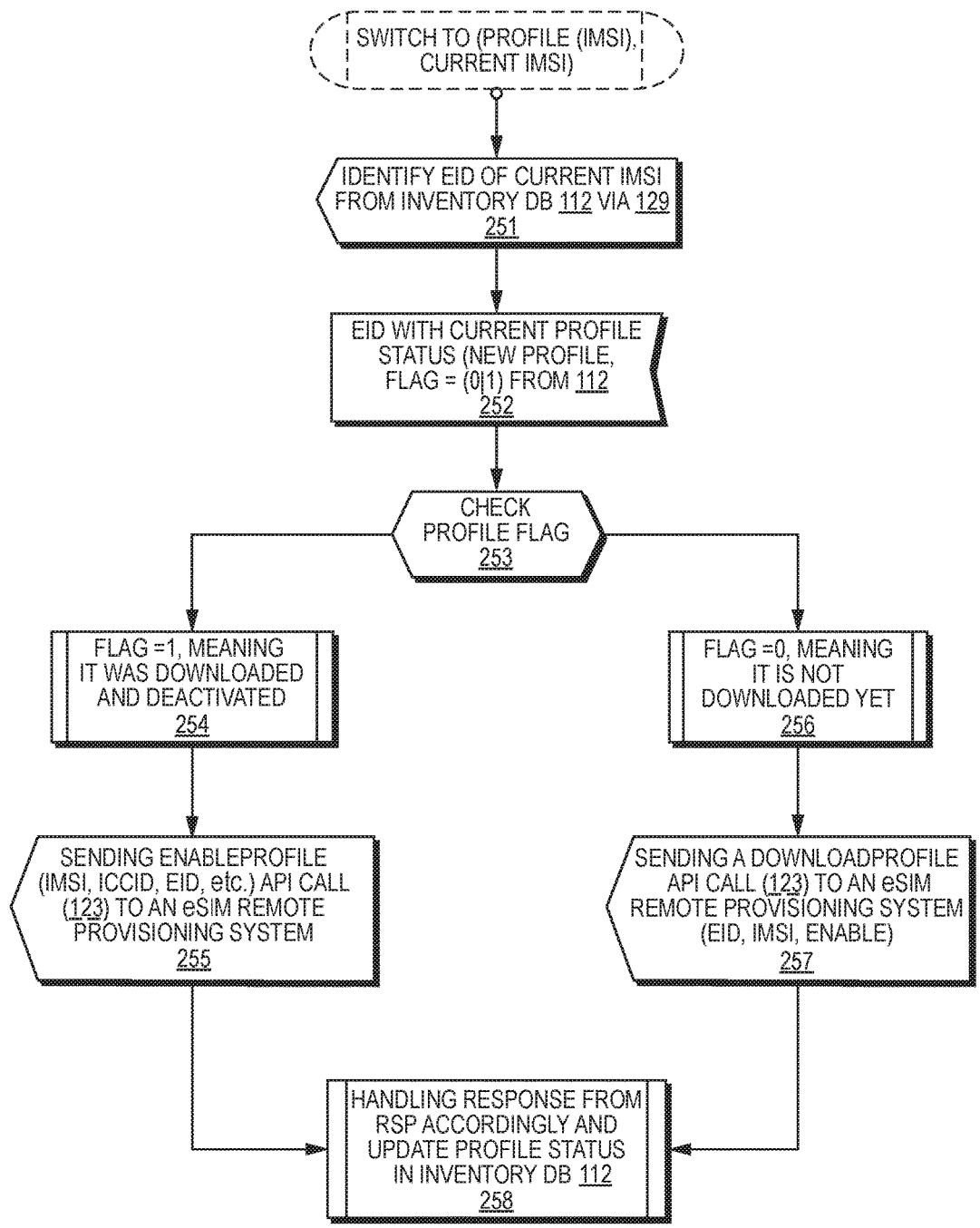

According to embodiments of the present disclosure, the switching logic module 109 is programmed with switching logic to automatically select and assign a Profile/IMSI to mobile devices (e.g., mobile device 150) that are part of the global service provider network 100. FIGS. 2A-2C illustrate an example switching logic of the switching logic module 109 according to some embodiments. As stated above, the switching logic module 109 selects a different IMSI associated with local MN 152 to assign mobile device 150 based on an internal switching logic and the plurality of inputs (114, 115, 118, 122 132, 125 and/or 129) received by the switching logic module 109.

Figure 4:
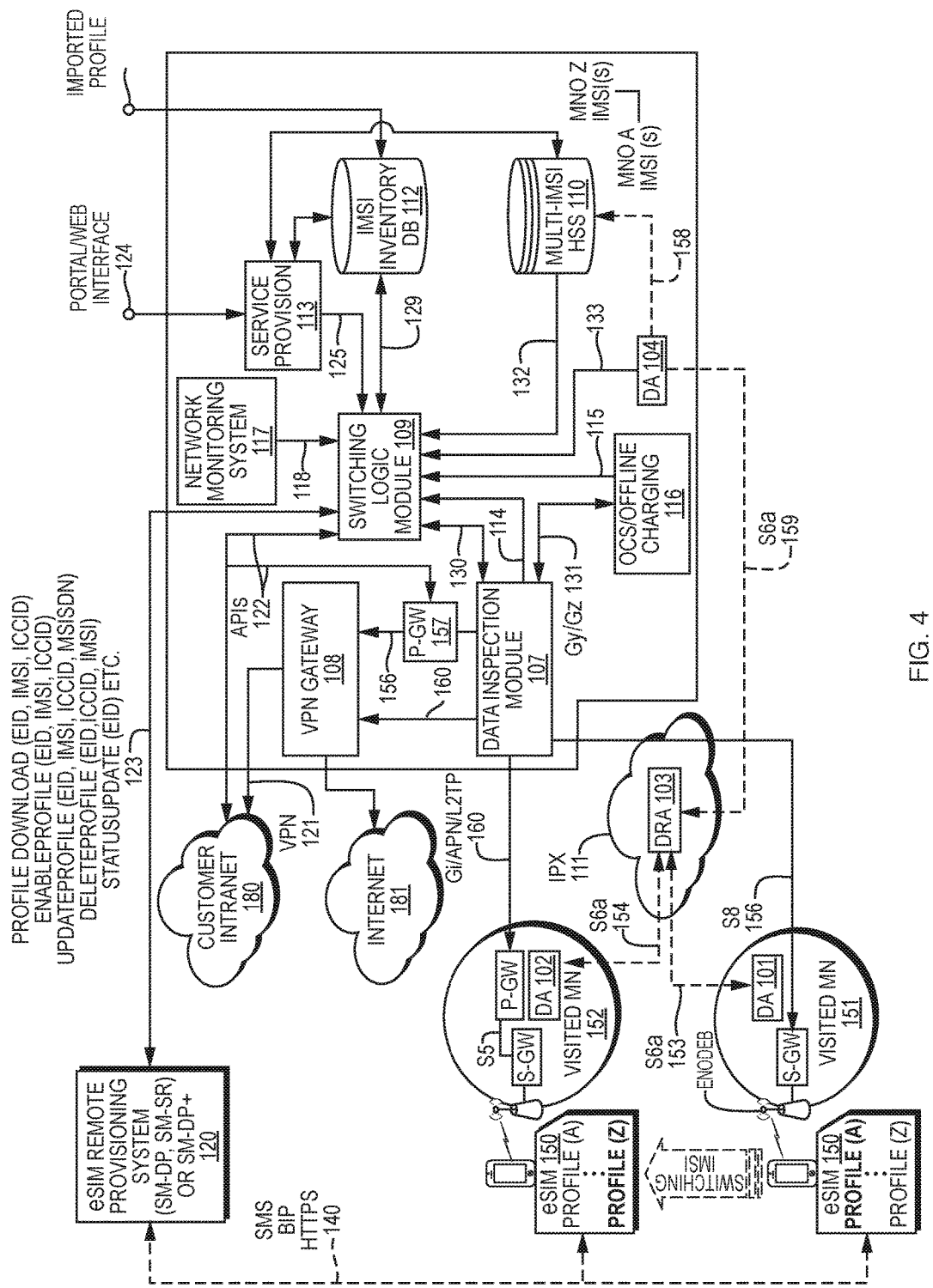
FIG. 4 illustrates an example communications system architecture enabling a global service provider network to control the remote provisioning of a mobile device.

FIG. 2A is a flow chart of an example switching logic that selects a profile/IMSI to provision a mobile device with based on inputs to the switching logic module 109. According to some embodiments, the switching logic module 109 may receive Location Update Information of the mobile device 150, via input 132, from the HSS 110. The Location Update Information 211 may include information regarding the Visited MCC/MNC, IMSI, IMEI, LAC, CellID, or other information related to the location and/or identity of the mobile device 150. In some embodiments, the switching logic module 109 may receive Location Update Information 210 of the mobile device 150, via input 133, from the DRA 302. This location information may be in addition to or in place of location information received from the HSS 110. Similarly, the location information received from the DA 104 (as shown in FIG. 4) may include information regarding the Visited MCC/MNC, IMSI, IMEI, or other information related to the location and/or identity of the mobile device 150.

According to some embodiments, the switching logic module 109 aggregates the Location Update Information 210 and 211 together, and extracts information 222 to identify mobile device 150 and its eSIM card status. The extracted information 222 may include information related to the identity of the mobile device 150, for example, IMSI, MCC/MNC, Device Type, etcetera.

According to the example embodiment of FIG. 2A, the switching logic module 109 may receive one or more notifications 212, via input 115, from the OCS/Offline Charging system 116. In some embodiments, the switching logic module 109 may generate actions for each IMSI per the received one or more notifications from the OCS/Offline Charging system 116. The generated actions 221 may include block or redirect to designated domain/portal in profile, etcetera.

According to the example embodiment of FIG. 2A, the switching logic module 109 may receive one or more business rules, via input 125, from the service provisioning system 113. The service provisioning system 113 may also receive input from a portal/web interface 124. Business rules may be rules and policies for each profile that depend on contractual conditions between the global service provider network and the mobile network operator associated with each profile. For example, a subscriber profile allocated to the global service provider network 100 by MN 151 may have a data rate depending on the application requesting the data on the mobile device 150, a data rate based on time-of-day/week, Service Level Agreement, a quality of service (QoS) threshold, a rate based on the device type, an uploading data volume limit, a download volume limit, applications that are permitted, protocols that are permitted, MNC/MCC that are permitted, regulations rules per MCC, default prof for control, among other contractual conditions. In some embodiments, the business rules for each subscriber profile are stored in a rules and policies database 216.

According to the example embodiment of FIG. 2A, the switching logic module 109 may receive 213 real-time information about mobile device 150, the mobile device's data usage, condition of the mobile network mobile device 150 is attached to, or any other information received from the data inspection module 107, via input 114. In some embodiments, the switching logic module 109 may receive, via input 118, historic network performance metrics 214 from the network monitoring system 117. The historic network performance metrics 214 may include network delay, network packet loss, network jitter and other network performance metrics known in the art.

In some embodiments, the switching logic module 109 may aggregate the real-time information it receives from multiple mobile devices operating on the same mobile network. The switching logic module 109 may utilize the aggregated real-time information to determine one or more network performance metrics of the mobile network the multiple mobile devices are operating on. This gives the switching logic module 109 access to real-time information regarding the current operation of the mobile networks. According to some embodiments, switching logic module 109 may generate a list mobile networks (and/or profiles belonging to those mobile networks) to avoid. The switching logic module 109 may use this list to prevent mobile devices from being provisioned with IMSIs or profiles associated with mobile networks currently (and/or historically) experiencing performance issues. Profiles, IMSI or mobile networks may be added to the list of profiles/IMSIs to avoid for any number of reasons in addition to current network performance issues.

According to some embodiments, the switching logic module 109 aggregates the real-time information 213 and the historic network performance metrics 214 together, and extracts information 217 from the received real-time measurements 213 and historic network performance 214. In some embodiments, the network profiles are associated with the extracted information 217. According to some embodiments, the switching logic module 109 may access the rules and policies database 216 and may generate an avoidance profile list 218 (i.e., a list of profiles that should not be assigned to users).

According to the example embodiment of FIG. 2A, the switching logic module 109 may compile or access 225 the extracted information 222 identifying mobile device 150 and its eSIM card status, the Rules and Policies from the Rules and Policies database 216, the generated action list 221 and the profile avoidance list 220 for the switching and control decision processes 230, shown in FIG. 2B.

FIG. 2B is a flow chart of an example switching and control decision process 230. The decision process 230 may be used to determine if an IMSI assigned to a mobile device (e.g., mobile device 150) should be switched to another IMSI associated with another profile.

According to some embodiments, the decision process 230 utilizes the compiled or accessed extracted information identifying mobile device 150 and its eSIM card status, the Rules and Policies from the Rules and Policies database 216, the generated action list 221 and the profile avoidance list 220 to determine whether or not to switch the mobile device's 150 IMSI. If the mobile device's IMSI should be switched, the decision process 230 determines which new IMSI to assign to the mobile device 150.

According to the example decision process 230 shown in FIG. 2B, the switching logic module 109 may determine 231 if the current IMSI assigned to the mobile device should be blocked based on the generated action list 221 and/or the profile avoidance list 220. In some embodiments, if the switching logic module 109 determines 231 the IMSI should be blocked, the switching logic module 109 causes the data inspection module 107 (via interface 130) to block traffic from that IMSI. The switching logic module 109 may also cause the mobile device 150 to switch 232 to another IMSI.

According to the example decision process 230, the switching logic module 109 may determine 233 if the current IMSI assigned to the mobile device should be redirected based on the generated action list 221. In some embodiments, if the switching logic module 109 determines 233 the IMSI should be redirected, the switching logic module 109 determines 234 if there is a profile for the IMSI redirection. If not, the switching logic module 109 causes the data inspection module (via interface 130) to redirect traffic for that IMSI. If there is a profile for IMSI redirection, the switching logic module 109 may determine 236 if the given redirect profile is in the avoidance list 220. If the given redirect profile is not on the avoidance list 220, then the switching logic module 109 causes the mobile device to switch 235 to a new IMSI and causes the data inspection module (via interface 130) to redirect traffic for that IMSI. If the given redirect profile is on the avoidance list 220, then the switching logic module 109 causes the mobile device to switch 238 to the default IMSI and causes the data inspection module (via interface 130) to redirect traffic for that IMSI.

According to the example decision process 230, if the switching logic module 109 determines 233 that the IMSI should not be redirected based on the avoidance list 221, then the switching logic module 109 determines 239 if the IMSI/deviceType is first attached. If the switching logic module 109 determines 239 that the IMSI/deviceType is not first attached, the switching logic module 109 determines that the device has been attached and may perform an application check and the Rules and Policies Database 216 to determine 245 a new profile for the mobile device 150. In some embodiments, the switching logic module 109 performs an application check by determining a specific application, internet website, or IP address the mobile device is requesting access to or currently utilizing. According to some embodiments, the data inspection module 107 may utilize deep packet inspection to determine the application, internet website, or IP address, etcetera, that the mobile device is requesting access and send the information to the switching logic module 109. The switching logic module 109 may select 246 the new profile based on a switching logic that depends on any one or more of the following: the new profile is more cost effective for the application, for load balance in the respective MCC, the new profile is for the specific type of device the mobile device 150 is, the new profile would provide better quality of service, the time-of-day/week, etcetera.

According to some embodiments, after the switching logic module 109 selects the new profile/IMSI for the mobile device 150, the switching logic module 109 determines 247 if the selected profile is in the profile avoidance list 220. The switching logic module 109 then switches 249 to the selected profile/IMSI unless 250 it is in the profile avoidance list 220.

According to some embodiments, if the switching logic module 109 determines 239 that the IMSI/deviceType is first attached, the switching logic module 109 then selects 240 one or more new profiles for the MCC/MNC based on the Rules and Policies from the Rules and Policies Database 216. If there are no profiles selected, the switching logic module 109 switches the mobile device's 150 profile/IMSI to the default profile/IMSI. If there are one or more profiles selected 241 then the switching logic module 109 switches 243 to the first selected profile of the one or more selected profiles that is not on the avoidance list 220. If all of the one or more selected profiles are on the avoidance list 220, the switching logic module 109 switches 243 the mobile device 150 to the default profile.

FIG. 2C is a flow chart showing an example process the switching logic module 109 may use to cause a mobile device to switch profiles/IMSIs. According to the example process in FIG. 2C, the switching logic module 109 causes the mobile device 150 to switch to a new profile/IMSI. The switching logic module 109 may identify 251 the EID of the current IMSI from the IMSI inventory database 112 (via interface 129). The switching logic module 109 may then access 252 the status of the current profile/IMSI and check 253 the profile flag. If the profile flag is set to one, the profile/IMSI was downloaded and deactivated 254 and the switching logic module 109 may send 255 Enable Profile (IMSI, ICCID, EID, etcetera) API call 123 to the eSIM Remote Provisioning System 255. In some embodiments, the switching logic module 109 may receive a handling response from the eSIM Remote Provisioning System 255 and then update 258 the profile status in the IMSI Inventory Database 112.

According to some embodiments, the profile flag may be set to zero, this indicates 256 to the switching logic module 109 that the profile/IMSI has not been downloaded. The switching logic module 109 may then send 257 a downloadProfile API call 123 to the eSIM Remote Provisioning System 255. In some embodiments, the switching logic module 109 may receive a handling response from the eSIM Remote Provisioning System 255 and then update 258 the profile status in the IMSI Inventory Database 112.

Figure 3:
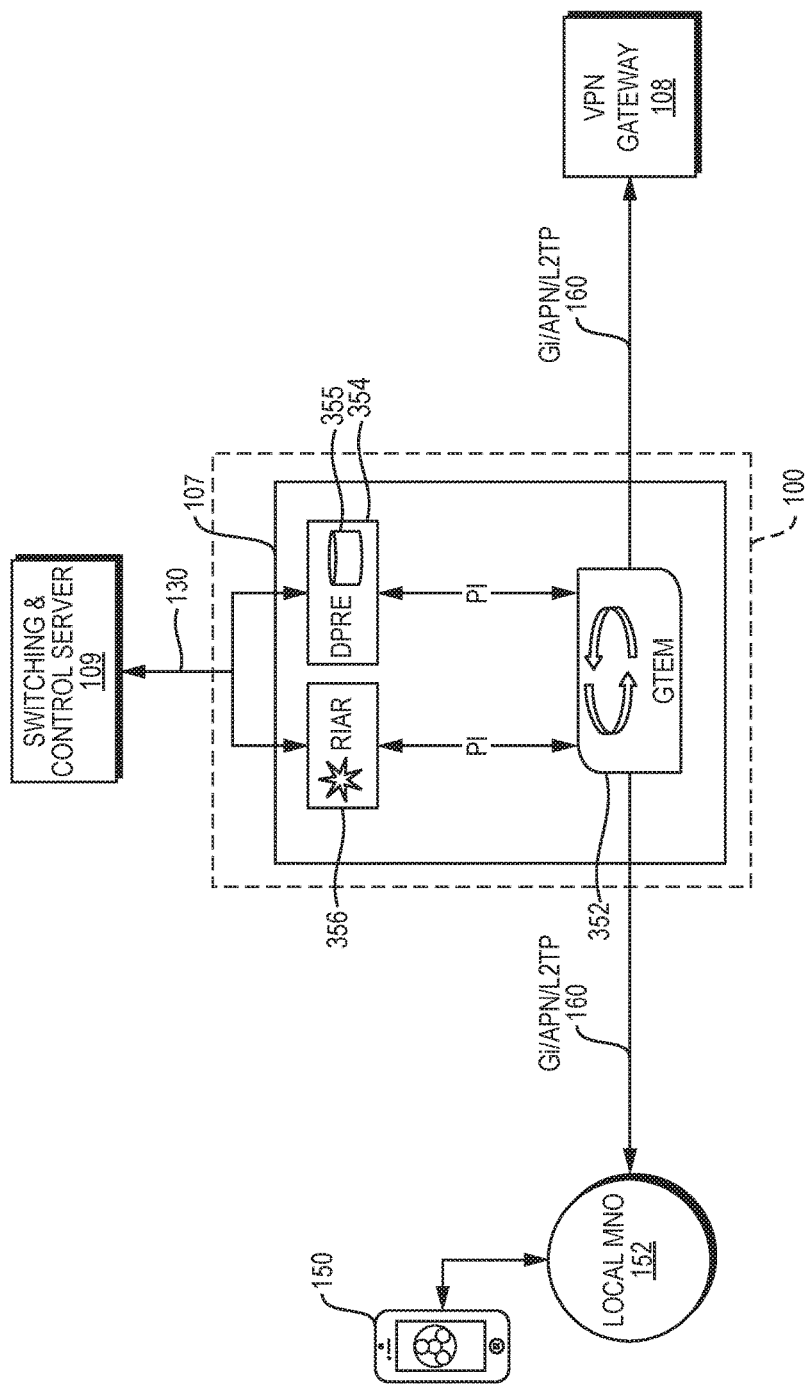
FIG. 3 is a high level block diagram of a data inspection module that includes a policy control platform, according to some embodiments of the present disclosure.

FIG. 3 is a high level block diagram of the data inspection including a policy control platform according to some embodiments of the present disclosure. According to at least one example embodiment, the mobile device 150 associated with the Global Service Provider network 100, is attached to and receiving data service from local MN 152. The mobile device 150 communicates data traffic between the local MN 152 and the Global Service Provider network 100 through the data interface 160. Similarly, the mobile device 150 may communicate data traffic between local MN 151 and Global Service Provider network 100 through the data interface 156. According to some embodiments, the Global Service Provider network 100 may include a data inspection module 107 having policy control functionality which the data traffic is routed through. The data inspection module 107 may include a data policy rule engine (DPRE) 354 that includes a data policy database 355 configured to store an identifier associated with the profile/IMSI of the mobile device 150, and/or a data policy for that profile/IMSI. The data policy may be a customizable individualized data policy for that specific profile/IMSI or mobile device. Alternatively, the data policy may be applied to a plurality of profiles/IMSIs or mobile devices. Effectively, as the mobile device 150 switches profiles/IMSIs, the mobile device's data policy may change. For example, when the mobile device 150 is provisioned with a first profile/IMSI the data policy may allow the mobile device 150 to access a specific data application. However, if the mobile device 150 is provisioned with a second profile/IMSI the data policy may not allow the mobile device 150 to access the specific data application.

According to some embodiments, the data policy for the profile/IMSI may indicate the specific data services (e.g., applications that use data, web browsing, specific websites, etcetera) available, set limits on the amount of useable data, set limits on data per data service, as well as other features detailed in the embodiments below. In some embodiments, the data policy is fully customizable and may be altered in real-time by the mobile subscriber, the Global Service Provider network 100, an entity other than the mobile subscriber responsible for the mobile device (e.g., the manufacturer of the device), and/or the mobile network operator of MN 151 or 152.

According to some embodiments, the data inspection module 107 contains a GTP based traffic detection and enforcement module (GTEM) 352. The GTEM 352 may be configured to identify a data request (e.g., GTP data packet) being sent from the mobile device 150 (or the profile/IMSI assigned to the mobile device 150) by reading the identifier in the data request, and deny or allow the data request based on the data policy for the profile/IMSI. The GTEM 352 may determine whether to deny or allow the request by accessing the data policy database 355 in the DPRE 354, and may ascertain the data policy for the specific profile/IMSI.

In some embodiments, the GTEM 352 is an inline device with a bypass mechanism which does not affect network topology and the transmission of data if the GTEM 352 stops operating.

According to some embodiments, the GTEM 352 may access the GTP control-plane and the GTP data plane (i.e., user plane) to inspect the control messages, signaling, and/or data being transmitted from the mobile device 150. This enables the GTEM 352 to enforce the mobile device's 150 (or the profile/IMSI assigned to the mobile device 150) specific data policy by identifying the GTP message or data packet originating from the mobile device 150 by reading the respective identifier from the message header, and taking the appropriate action (or non-action) based on the mobile device's 150 (or the profile/IMSI assigned to the mobile device 150) data policy.

In some embodiments, the GTEM 352 utilizes deep packet inspection (DPI) to examine and inspect the GTP data traffic as it passes through the data inspection module 107. The GTEM 352 is not only able to determine the mobile device 150 sending or receiving the data packet/request, but is also able to identify the data service (e.g., application, website, etcetera) being used. According to the example embodiment illustrated in the FIG. 3, the data traffic passes through the data inspection module 107 to the VPN Gateway 108. The data traffic can also pass through data inspection module 107 to P-GW 157. However, in other embodiments the data traffic may pass through the data inspection module 107 to any other destination, including the Internet 181, or a Customer Intranet network 180.

According to some embodiments, the GTEM 352 inspects data packets for signatures of data services, and compares the signature from the data packet to known signatures for data services stored in a signature database to determine the data service being used or requested by the data packet. In some embodiments, the GTEM 352 utilizes a finite state-machine to minimize false positives and signature guessing. In some embodiments, the GTEM 352 utilizes a multipath signature analysis designed to identify the signatures of polymorphic applications.

In some embodiments, for each data packet from the mobile device 150, the GTEM 352 may transmit the amount of data and the data service to the DPRE 354. The DPRE 354 may receive this information and store (or update a count of) the total amount of data used per data service for the mobile device 150 (or the profile/IMSI assigned to the mobile device 150). The DPRE 354 is then able to keep a running count of the data used by each mobile device and profile/IMSI associated with the Global Service Provider network 100 on a per data service basis. According to some embodiments, once a data limit in the data policy is reached the GTEM 352 will take the appropriate action for any further data packets. This enables the GTEM 352 to enforce any data limits set in the mobile device's (or the profile/IMSI assigned to the mobile device 150) data policy.

According to some embodiments, the GTEM 352 filters the data traffic (packets and requests) based on the information extracted from the data traffic and the data policy of the originating mobile device or the profile/IMSI assigned to the mobile device. While filtering the data traffic, the GTEM 352 may act as a transparent "firewall" that filters data packets and connections. In some embodiments, once the GTEM 352 accepts a connection, all of the data packets transferred in the connection or data path are subsequently inspected for conformance to the respective data policy.

For a non-limiting example, the GTEM 352 may filter data packets and connections in the following ways: (1) accept the connection based on predefined criteria; (2) reject the connection, terminating the flow by sending a TCP RST (reset) packet or an Internet Control Message Protocol (ICMP) destination unreachable message to the peers (e.g., the mobile device and targeted destination); (3) silently drop the packet and discard the flow; (4) inject the packet with a fake server response and send it to the originating user network device based on the rule's inject data (e.g., HTTP traffic inject); (5) shunt the connection by selectively ignoring parts of the data traffic; or (6) divert the packet or connection.

According to some embodiments, the GTEM 352 may divert data packets or connections by steering them to or through modules or devices that may perform additional functions not supported by the GTEM 352. These modules or devices may perform value added services, such as, caching, HTML rewriting, video optimization, security functions, etcetera.

In some embodiments, the GTEM 352 may be configured to trigger actions when certain user-defined (e.g., the mobile subscriber, the Global Service Provider network 100, an entity other than the mobile subscriber responsible for the mobile device (e.g., the manufacturer), and/or the Local MNO 152, etcetera) criteria are met. The user-defined criteria may be based on counters or thresholds that may be customized to perform complex operations. For example, the GTEM 352 may trigger a message (e.g., an email, text, voice message, phone call, etcetera) to be sent to a network operator when certain criteria are met. In some embodiments, the GTEM 352 executes a host trigger when a host or provisioned identifier reaches a certain threshold. In some embodiments, the GTEM 352 executes a filtering trigger that executes when a matching filtering rule is triggered. In some embodiments, the GTEM 352 executes a subscriber trigger to reset updates based on subscriber session events, such as counter thresholds being met.

Referring back to FIG. 3, according to some embodiments, the data inspection module 107 includes a real-time intelligent analysis and reporting module (RIAR) 356 that provides real-time visibility into the GTP signaling/data and other IP data payloads inspected by the GTEM 352. In some embodiments, the RIAR 356 provides a real-time view of the quality of experience (QoE) metrics of the mobile device 150 to the mobile subscriber, the Global Service Provider network 100, an entity other than the mobile subscriber responsible for the mobile device (e.g., the manufacturer), and/or the Local MNO 152 or 151. The QoE metrics may be locally stored by the RIAR 356 and/or exported to external systems or modules (e.g., the switching logic module 109, service provision module 113, etcetera).

According to some embodiments, the DPRE 254 may be configured to interface (via 130) with the switching logic module 109 of the global service provider network 100. This enables the switching logic module 109 to directly control and configure the data policy of the mobile device 150 or the profile/IMSI assigned to the mobile device 150 by using the GTEM 352 in the data inspection module 107. This may be beneficial as data packets can be denied, modified, rerouted, etcetera, on the global service provider network 100 before they reach their respective destination. Thus, giving the global service provider network 100 control over the mobile device's or the profile/IMSI assigned to the mobile device 150 data usage even before the data packets/requests reach their respective destination.

According to some embodiments, the RIAR 356 may be configured to interface (via 114) with the switching logic module 109 of the global service provider network 100. This enables the switching logic module 109 to directly access the real-time visibility into the GTP signaling/data and other IP data payloads inspected by the GTEM 352. As described above in reference to FIG. 2A, the switching logic module 109 may utilize this information as an input to determine whether to switch the mobile device's current profile/IMSI and determine which other profile/IMSI to provision the mobile device 150 with.

According to some embodiments, the RPRE 354 may be configured to (or at least interface with) access the Online Charging System (OCS)/Offline Charging System 116 of the global service provider network 100. In some embodiments, the DPRE 354 may interface with the OCS 116 via a Gy/GZ interface 131, providing the DPRE 354 real-time access to the rating plans for rating, charging, and monitoring the credit of pre-paid mobile subscribers. Thus, if a pre-paid mobile subscriber has used all of their pre-paid credit (e.g., a data amount, dollar amount, etcetera), the GTEM 352 may block the pre-paid mobile subscriber's data access before any more data is used.

FIG. 4 illustrates an example communications system architecture enabling a global service provider network 100 to control the remote provisioning of mobile device 150. According to the example embodiment illustrated in FIG. 4, Mobile Network 151 and Mobile Network 152 are providing data service to mobile device 150 as visited mobile networks. This means the profile/IMSI assigned to mobile device 150 (according to this example embodiment) is subscribed to mobile networks other than Mobile Network 151 and Mobile Network 152.

According to this example, mobile device 150 is first provisioned with Profile (A) and attached to the Mobile Network 151. Mobile Network 151 may provide data service to mobile device 150 via a home routed roaming model, with the data traffic 156 and diameter signaling 153 being routed through an internetwork Packet Exchange (IPX) network 111. In some embodiments, the IPX 111 includes a diameter routing agent (DRA) 103 that is configured to route the diameter signaling to a diameter agent 104 in the Global Service Provider network 100. The diameter agent 104 may communicate the diameter signaling to the HSS 110 (via interface 158) and to the switching logic module 109 (via interface 133). In some embodiments, the switching logic module 109 may utilize the diameter signaling as an input to the switching logic.

According to this example, mobile device 150 is then provisioned with Profile (Z) and attached to Mobile Network 152. Mobile Network 152 may provide data service to mobile device 150 via a local breakout or hub breakout roaming model, with the data traffic 160 being directly routed to the data inspection module 107 and diameter signaling 154 being routed through the IPX network 111. In some embodiments, the DRA 103 is configured to aggregate the diameter signaling route the diameter signaling 159 to a diameter agent 104 in the Global Service Provider network 100.

Figure 5:
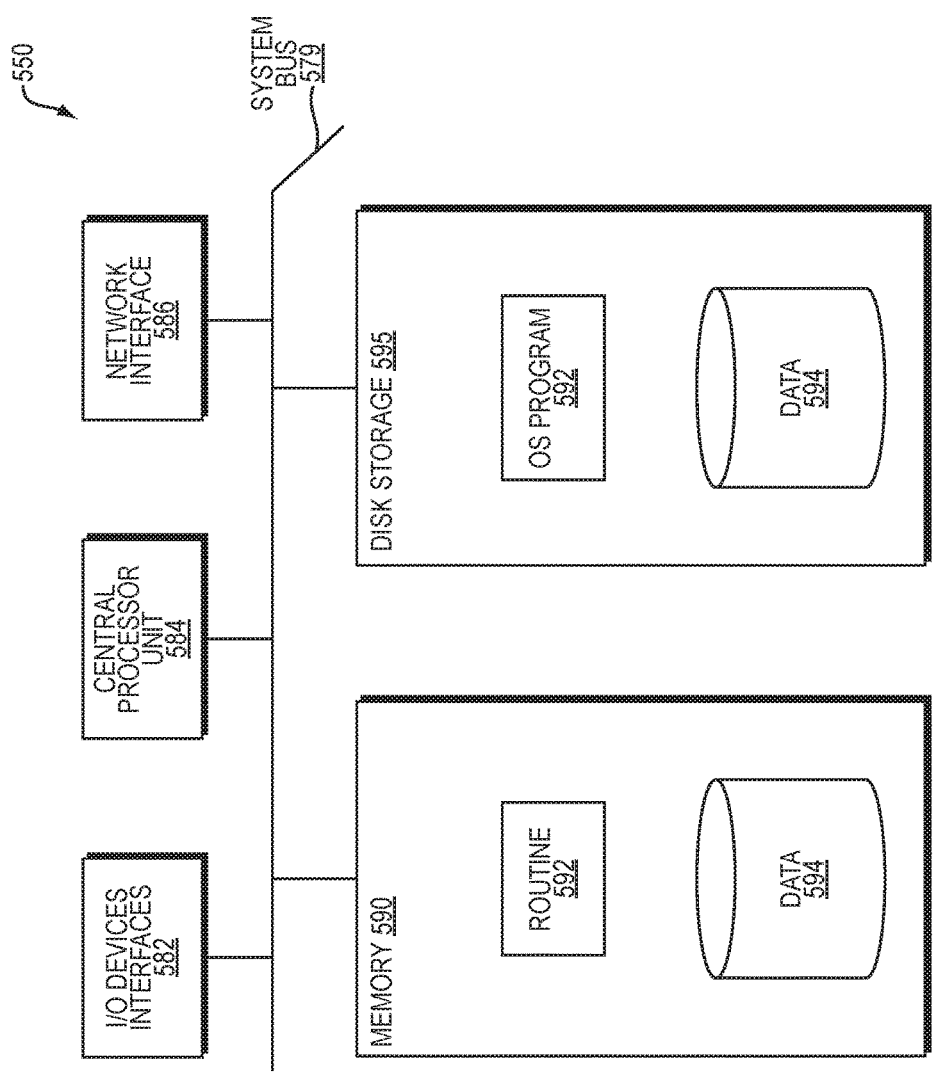
FIG. 5 is a block diagram of the internal structure of a computer in which various embodiments of the present invention may be implemented.

FIG. 5 is a block diagram of the internal structure of a computer 550 in which various embodiments of the present invention may be implemented. The computer 550 contains a system bus 579, where a bus is a set of hardware lines used for data transfer among the components of a computer or processing system. Bus 579 is essentially a shared conduit that connects different elements of a computer system (e.g., processor, disk storage, memory, input/output ports, network ports, etcetera) that enables the transfer of information between the elements. Attached to system bus 579 is I/O device interface 582 for connecting various input and output devices (e.g., keyboard, mouse, displays, printers, speakers, etcetera) to the computer 550. Network interface 586 allows the computer 550 to connect to various other devices attached to a network. Memory 590 provides volatile storage for computer software instructions 592 and data 594 used to implement an embodiment of the present disclosure. Disk storage 595 provides non-volatile storage for computer software instructions 592 and data 594 used to implement an embodiment of the present invention. Central processor unit 584 is also attached to system bus 579 and provides for the execution of computer instructions.

In one embodiment, the processor routines 592 and data 594 are a computer program product (generally referenced 592), including a computer readable medium (e.g., a removable storage medium such as one or more DVD-ROM's, CD-ROM's, diskettes, tapes, etcetera) that provides at least a portion of the software instructions for the invention system. Computer program product 592 can be installed by any suitable software installation procedure, as is well known in the art.

In another embodiment, at least a portion of the software instructions may also be downloaded over a cable, communication and/or wireless connection.

Further, the present invention may be implemented in a variety of computer architectures. The computer of FIG. 5 is for purposes of illustration and not limitation of the present invention.

While example embodiments have been particularly shown and described, it will be understood by those skilled in the art that various changes in form and details may be made therein without departing from the scope encompassed by the appended claims.

It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etcetera, which enables the transfer of information between the elements. One or more central processor units are attached to the system bus and provide for the execution of computer instructions. Also attached to system bus are typically I/O device interfaces for connecting various input and output devices, e.g., keyboard, mouse, displays, printers, speakers, etcetera, to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etcetera, that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etcetera.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A system comprising:
a data inspection module configured to:
inspect data traffic originating from a mobile device assigned a first international mobile subscriber identity (IMSI) associated with a first mobile network,
determine an identity of a data service the mobile device is requesting or accessing from the inspected data traffic, the identity of the data service being an identity of at least one of: (i) a software application executed by the mobile device requesting or accessing a data connection, (ii) an internet website requested by the mobile device, and (iii) an internet protocol address the mobile device has requested access to, and
send the identity of the data service to a switching logic module; and
the switching logic module communicatively coupled to the data inspection module and configured to:
receive the identity of the data service the mobile device requested,
select a second IMSI associated with a second mobile network to assign to the mobile device, said selecting of the second IMSI at least partially based on the identity of the data service determined from the inspected data traffic originating from the mobile device, and
assign the second IMSI to the mobile device.

2. The system of claim 1 wherein the switching logic module is further configured to determine the second IMSI is not included in a list of IMSIs to avoid before assigning the second IMSI to the mobile device.

3. The system of claim 1 wherein the data inspection module is further configured to inspect the data traffic originating from the mobile device for signatures of data services, and to determine the identity of the data service the mobile device is requesting or accessing from the inspected data traffic by comparing a signature of a data service from the inspected data traffic to known signatures of data services stored in a signature database.

4. The system of claim 1 wherein the data inspection module is configured to use deep packet inspection to inspect the data traffic originating from the mobile device.

5. The system of claim 1 wherein the switching logic module is configured to select the second IMSI based on a rate the second mobile network charges for the identified data service being requested or accessed by the mobile device, the rate the second mobile network charges being specific to the identified data service.

6. The system of claim 1 wherein said selecting of the second IMSI is further based on any one or more of the following: condition of the first or second mobile network, type of data the mobile device is requesting, and amount of data requested by the mobile device.

7. The system of claim 3 wherein the data inspection module is further configured to:
track an amount of data used by a plurality of mobile devices over a given period of time, each mobile device assigned an IMSI associated with the first mobile network; and
the switching logic module is further configured to:
select different IMSIs to assign to at least some of the plurality of mobile devices, each different IMSI associated with a network other than the first mobile network, and said selecting at least partially based on the amount of data used by the plurality of mobile devices over the given period of time, and
assign the selected different IMSIs to the at least some of the plurality of mobile devices.

8. The system of claim 3 wherein the data inspection module is further configured to determine network performance metrics for a given mobile network based on inspecting data traffic from a plurality of mobile devices, each of the plurality of mobile devices assigned an IMSI associated with the given mobile network.

9. The system of claim 3 wherein the data inspection module is further configured to deny, allow or modify inspected data traffic based on a data policy associated with a currently assigned IMSI of the mobile device.

10. The system of claim 3 wherein the data inspection module is further configured to deny, allow or modify an inspected data traffic based on a type of the mobile device.

11. The system of claim 1 wherein said selecting of the second IMSI is further based on any one or more of the following:
country of the first mobile network or the second mobile network,
location of the mobile device,
operator of the first mobile network or the second mobile network,
data rate cost of the first mobile network or the second mobile network, and
quality of service of first mobile network or the second mobile network.

12. The system of claim 3 wherein the mobile device is roaming on the first mobile network before the mobile device is assigned the second IMSI.

13. A method comprising:
inspecting data traffic originating from a mobile device assigned a first international mobile subscriber identity (IMSI) associated with a first mobile network;
determining an identity of a data service the mobile device is requesting or accessing from the inspected data traffic, the identity of the data service being an identity of at least one of: (i) a software application executed by the mobile device requesting or accessing a data connection, (ii) an internet website the mobile device is requesting, and (iii) an internet protocol address the mobile device is requesting access to;
selecting a second IMSI associated with a second mobile network to assign to the mobile device, the selection of the second IMSI at least partially based on the identity of the data service determined from the inspected data traffic originating from the mobile device; and
assigning the second IMSI to the mobile device.

14. The method of claim 13 further comprising determining the second IMSI is not included in a list of IMSIs to avoid before assigning the second IMSI to the mobile device.

15. The method of claim 13 further comprising inspecting the data traffic originating from the mobile device for signatures of data services, and determining the identity of the data service the mobile device is requesting or accessing from the inspected data traffic by comparing a signature of a data service from the inspected data traffic to known signatures of data services stored in a signature database.

16. The method of claim 13 wherein the data traffic is inspected using deep packet inspection.

17. The method of claim 13 wherein selecting the second IMSI is based on a rate the second mobile network charges for the identified data service being requested or accessed by the mobile device, the rate the second mobile network charges being specific to the identified data service.

18. The method of claim 13 wherein said selecting of the second IMSI is further based on any one or more of the following: condition of the first or second mobile network, type of data the mobile device is requesting and amount of data requested by the mobile device.

19. The method of claim 15 further comprising:
tracking an amount of data used by a plurality of mobile devices over a given period of time, each mobile device assigned an IMSI associated with the first mobile network;
selecting different IMSIs to assign to at least some of the plurality of mobile devices, each different IMSI associated with a network other than the first mobile network, and the selection at least partially based on the amount of data used by the plurality of mobile devices over the given period of time; and
assigning the selected different IMSIs to the at least some of the plurality of mobile devices.

20. The method of claim 15 further comprising denying, allowing or modifying inspected data traffic based on a data policy associated with a currently assigned IMSI of the mobile device.

21. The method of claim 15 further comprising determining network performance metrics for a given mobile network based on inspecting data traffic from a plurality of mobile devices, each of the plurality of mobile devices assigned an IMSI associated with the given mobile network.

22. The method of claim 15 further comprising denying, allowing or modifying inspected data traffic based on a type of the mobile device.

23. The method of claim 13 wherein said selecting of the second IMSI is further based on any one or more of the following:
country of the first mobile network or the second mobile network,
location of the mobile device,
operator of the first mobile network or the second mobile network,
data rate cost of the first mobile network or the second mobile network, and
quality of service of first mobile network or the second mobile network.

24. The method of claim 15 wherein the mobile device is roaming on the first mobile network before the mobile device is assigned the second IMSI.

\* \* \* \* \*